US007452280B2

(12) United States Patent
Kopera et al.

(10) Patent No.: US 7,452,280 B2
(45) Date of Patent: Nov. 18, 2008

(54) GAMING MACHINE WITH COMMON TOP BOX SUBSTRUCTURE

(75) Inventors: Thomas M. Kopera, Villa Park, IL (US); Bradley D. Cornell, Chicago, IL (US); Wayne H. Rothschild, Northbrook, IL (US); Scott M. Irving, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 931 days.

(21) Appl. No.: 10/658,921

(22) Filed: Sep. 10, 2003

(65) Prior Publication Data

US 2005/0054449 A1 Mar. 10, 2005

(51) Int. Cl.
*A63F 13/00* (2006.01)

(52) U.S. Cl. .............................. 463/46; 463/30; 463/47

(58) Field of Classification Search ................... 463/30, 463/46, 47

See application file for complete search history.

(56) References Cited

U.S. PATENT DOCUMENTS

| | | | | |
|---|---|---|---|---|
| 4,440,457 | A * | 4/1984 | Fogelman et al. | 463/46 |
| 4,718,672 | A | 1/1988 | Okada | 273/143 |
| 4,865,322 | A | 9/1989 | Krutsch | 273/121 |
| 5,110,120 | A | 5/1992 | Smolucha | 273/121 |
| 5,216,579 | A | 6/1993 | Basara et al. | |
| 5,544,728 | A | 8/1996 | Dabrowski | 194/206 |
| 5,813,914 | A | 9/1998 | McKay et al. | 463/46 |
| 6,068,101 | A | 5/2000 | Dickenson et al. | 194/206 |
| 6,135,884 | A | 10/2000 | Hedrick et al. | 463/20 |
| 6,164,645 | A | 12/2000 | Weiss | 273/138.2 |
| 6,231,446 | B1 * | 5/2001 | Majima et al. | 463/46 |
| 6,254,481 | B1 | 7/2001 | Jaffe | 463/20 |
| 6,475,087 | B1 | 11/2002 | Cole | 463/20 |
| 2001/0031665 | A1 * | 10/2001 | Taho et al. | 463/43 |
| 2003/0027627 | A1 | 2/2003 | Cole | 463/20 |
| 2003/0224858 | A1 * | 12/2003 | Yoseloff et al. | 463/43 |
| 2004/0051249 | A1 * | 3/2004 | Seelig et al. | 273/309 |

FOREIGN PATENT DOCUMENTS

| | | |
|---|---|---|
| EP | 0 886 250 | 6/1998 |
| GB | 2 136 255 | 2/1983 |
| WO | WO 03/028829 | 4/2003 |

OTHER PUBLICATIONS

Combined Search and Examination Report for Great Britain Application No. GB0418661.5 dated Dec. 20, 2004 (1 page).

Canadian Office Action, Application No. 2,480,974 dated Sep. 6, 2007 (3 pages).

* cited by examiner

*Primary Examiner*—John M Hotaling, II
*Assistant Examiner*—Adetokunbo Torimiro
(74) *Attorney, Agent, or Firm*—Nixon Peabody LLP

(57) ABSTRACT

A gaming machine for conducting a wagering game includes a game display and a top box display. The game display is for displaying the wagering game. The top box display includes a standard substructure for attaching subassemblies. The substructure contains fixed connection points allowing subassemblies to be developed in a fashion consistent with the substructure, thus simplifying the ability to swap components and reducing the dependence on unique internal part designs.

20 Claims, 8 Drawing Sheets

GAMING MACHINE WITH COMMON TOP BOX SUBSTRUCTURE

FIELD OF THE INVENTION

The present invention relates generally to gaming machines and, more specifically, to a gaming machine with a top box display area including a common substructure. The substructure is substantially identical on all top boxes associated with the main game cabinet thus simplifying design for top box display components and allowing easier game theme changes.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Players also appreciate the reliability of a gaming machine, as do the casino operators. Shrewd operators consequently strive to employ the most entertaining, exciting, and reliable machines available because such machines attract frequent play and hence increase profitability to the operator.

Gaming machines display a variety of visual attraction devices, models, signs, and other forms of information. Methods used to display these items include fixed permanently printed glass, video displays, fixed artwork, and model displays.

Historically, gaming machines presented a single game and top box display. To alter game offerings, casino operators needed to replace the entire gaming machine (or the entire top box display). If the operator wanted to relocate a machine to a different position on the casino floor, the entire machine would have to be moved. Replacement and relocation processes are slow and counter-productive to maintaining pace with the continuously changing gambling industry. To better serve their customers, casino operators need a method of converting and/or moving games quickly.

Another aspect of the difficulty in modifying or changing games relates directly to the service personnel responsible for the conversion. In many cases, a conversion of a gaming machine would require the replacement of the top box display and marquee. This typically requires the services of at least two service technicians to manage the weight of the top box. The difficulty of shipping and storing a large and heavy top box display in itself is cost-prohibitive. Requiring two technicians to remove one top box display and replace it with another is also costly.

Gaming Machine manufacturers, especially those that produce video-based gaming machines, have responded quickly to this need. One such response is the development of a plain gaming terminal that allows multiple games to be presented on the same machine. This method addresses the issue of offering more games and placing them at optimal locations during peak playing times, and also addresses the issue of converting games to the latest offerings by the gaming machine manufacturer (by performing a software conversion).

What is not addressed is the ability to transition the top box display easily when a conversion to a new game occurs. For example, if a casino operator decides that a certain video reel slot game, using a particular molded model display, has reached the end of its playing life on the casino floor, the operator contacts the manufacturer and requests a conversion of the gaming machine to a newer, perhaps more popular game. While the conversion of the main video-based reel slot game is a simple software and surface artwork change, the top box display area typically requires a complete replacement. This can be time-consuming, expensive, and cumbersome.

This issue is also indicative of top box failures and the method of repair. Should a failure occur in a top box display, the typical response is to send an entire, functional top box to the casino, remove the failed top box, and return the failed top box to the service office to diagnose the problem. Again, this method requires the services of two or more technicians.

To make top box conversions and repairs faster, easier, and more cost effective, the use of a common substructure in accordance with the present invention would reduce the variations of the assembly mechanisms in top box display offerings, simplify the conversion or repair process, and modularize the sub-components to allow pre-tested subassemblies to be installed by a single service technician.

SUMMARY OF THE INVENTION

The present invention provides a common substructure for the top box display area in a gaming machine. The substructure allows for display component design standards that ensure easier top box display changes during game conversions and top box repair.

BRIEF DESCRIPTION OF THE DRAWINGS

The foregoing and other advantages of the invention will become apparent upon reading the following detailed description and upon reference to the drawings in which.

Figure 1:
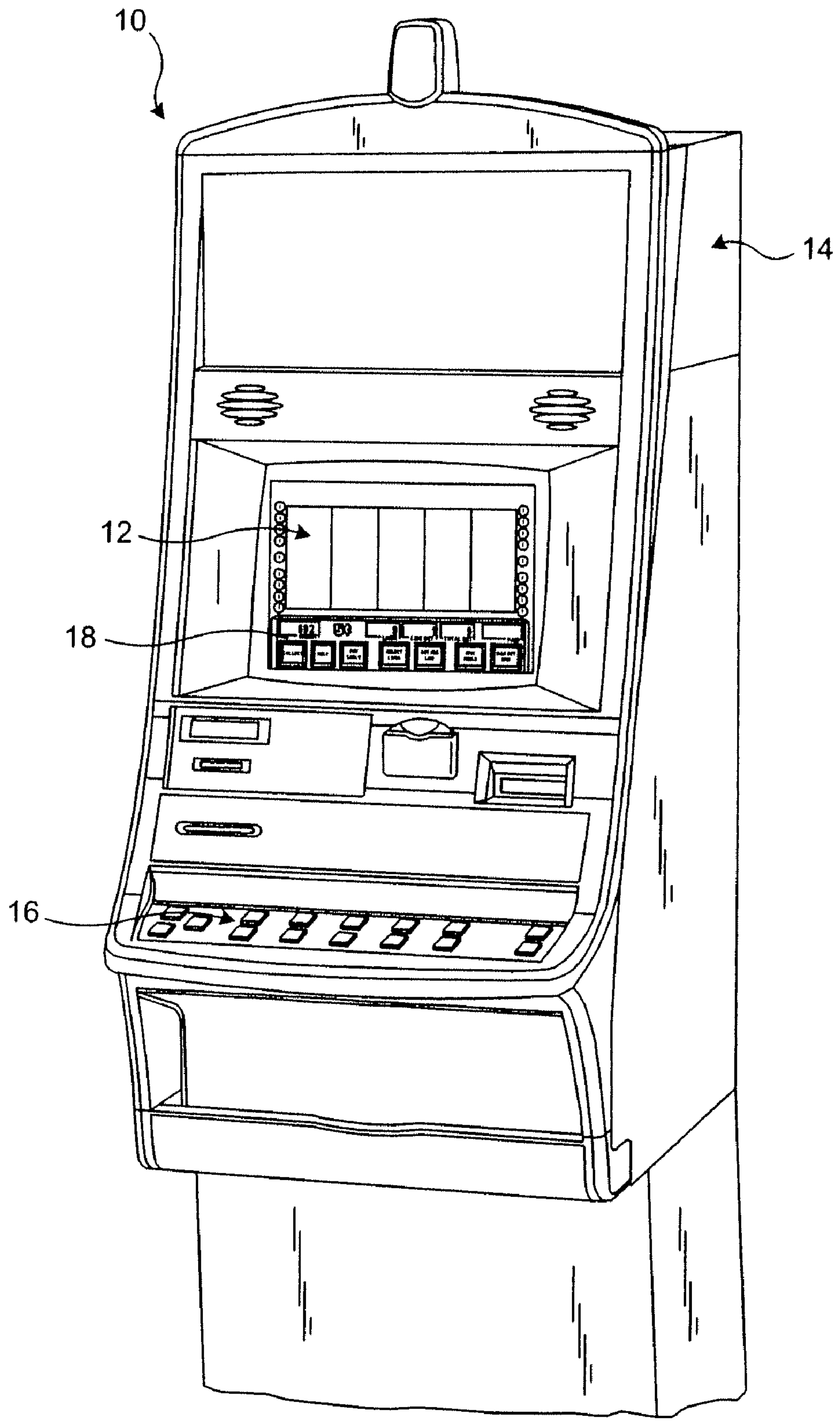
FIG. 1 is a perspective view of a gaming machine with a top box display in accordance with the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

FIG. 1 depicts a gaming machine 10 operable to conduct a slot-based wagering game. In operation, the gaming machine receives a wager from a player to purchase a "play" of the game. In a "play" of the game, the gaming machine generates at least one random event and provides an award to the player for a winning outcome of the random event. The random event may be internally or remotely determined using a random number generator or pooling schema. To portray the random event and outcome to the player, the gaming machine includes a primary display 12. If the wagering game is a reel slot game, for example, the primary display 12 includes a plurality of symbol-bearing reels that are rotated and stopped to place symbols on the reels in visual association with the pay line.

The primary display 12 may be implemented with a CRT, LCD, plasma, mechanical reels (in the case of a reel slot game), or other type of display known in the art. The primary display 12, especially if implemented in video, may be overlaid with a touch screen to facilitate interaction with the player. In the illustrated embodiment, the gaming machine 10 is an "upright" version in which the primary display 12 is oriented vertically relative to the player. Alternatively, the gaming machine may be a "slant-top" version in which the primary display 12 is slanted at about a thirty-degree angle toward the player of the gaming machine 10.

Figure 2:
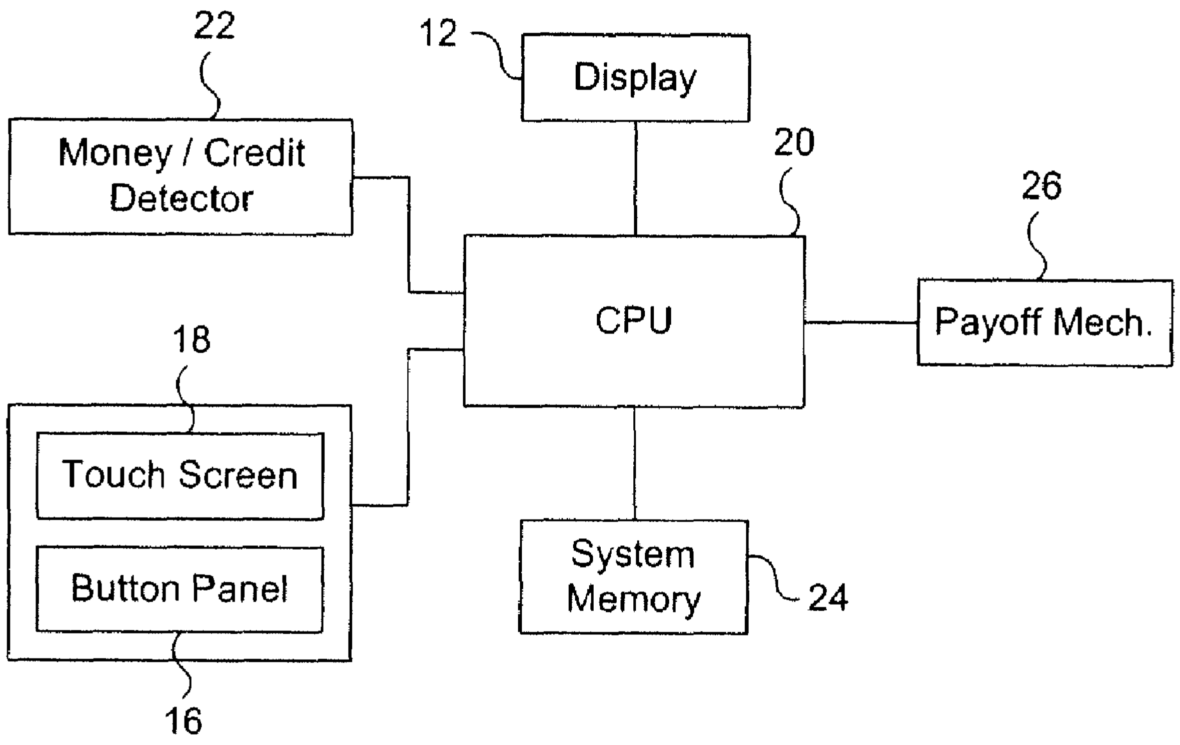
FIG. 2 is a block diagram of a control system suitable for operating the gaming machine.

FIG. 2 is a block diagram of a control system suitable for operating the gaming machine. Money/credit detector 22 signals a central processing unit (CPU) 22 when a player has inserted money or played a number of credits. Using a button panel 16 and/or a touch screen 18 (also see FIG. 1), the player may select any variables associated with the wagering game and place his/her wager to purchase a play of the game. In a play of the game, the CPU 20 generates at least one random event using a random number generator or pooling schema and provides an award to the player for a winning outcome of the random event. The CPU 20 operates the display 12 to represent the random event(s) and outcome(s) in a visual form that can be understood by the player. In addition to the CPU 20, the control system may include one or more additional slave control units for operating the display 12 and any secondary displays.

System memory 24 stores control software, operational instructions and data associated with the gaming machine. In one embodiment, the system memory 24 comprises a separate read-only memory (ROM) and battery-backed random-access memory (RAM). However, it will be appreciated that the system memory 24 may be implemented on any of several alternative types of memory structures or may be implemented on a single memory structure. A payoff mechanism 26 is operable in response to instructions from the CPU 20 to award a payoff to the player. The payoff may, for example, be in the form of a number of credits. The number of credits is determined by one or more math tables stored in the system memory 24.

Figure 3:
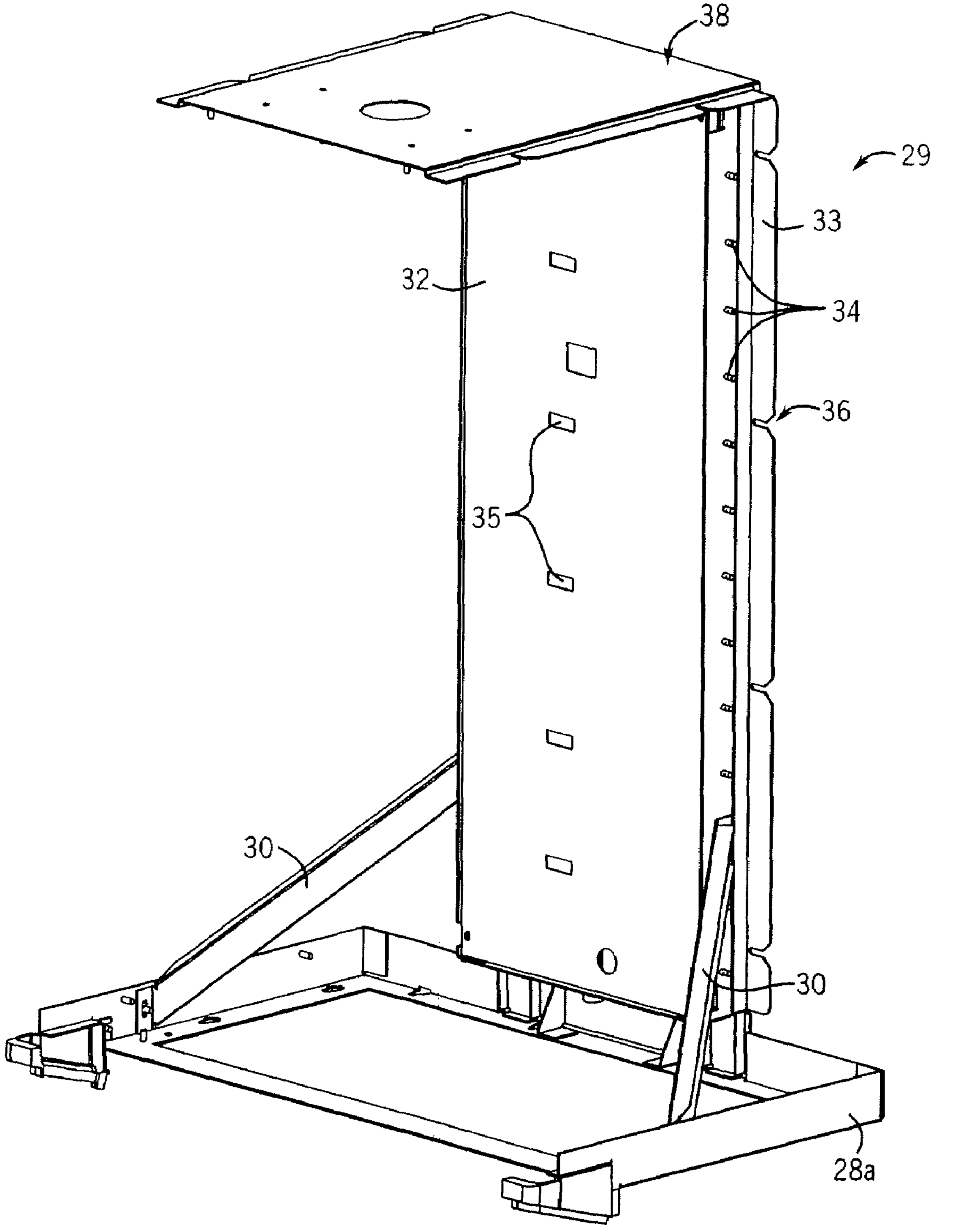
FIG. 3 is a perspective view of a top box substructure for an upright gaming machine.

FIG. 3 shows an example of a top box substructure 29 for an upright gaming machine. The substructure 29 resides in the top box display area 14 of the gaming machine 10 (shown in FIG. 1). The substructure 29 is comprised of a number of components, all of which are manufactured of a rigid material such as hard plastic, aluminum or steel. As will be appreciated by those with ordinary skill in the art, the type of material used to manufacture the substructure 29 can vary and be of such a substance as to adequately support the components being attached to it. A transition bracket **28*a* connects the substructure to the base game. An assembly comprised of a cable chase 32 and a connection bracket 33 creates the vertical portion of substructure 29. This assembly is attached to transition bracket 28*a* and supported by two angle supports 30. Transition bracket 28*a*** attaches to the base game structure using fasteners such as bolts or screws. Typically, once the entire substructure is fastened to the base game structure, it is not considered a replaceable component.

Cable chase 32 is a wide, U-shaped structure with space behind it to run power and data cabling. Cable chase 32 also contains a number of connector holes 35 to allow access to cabling at varied points depending on the requirements of the display being attached to substructure 29. The size of each connector hole 35 in the cable chase 32 can be standardized to allow for the placement of cable connectors manufactured with standard clips. Grommet material may also be used to reduce the sharpness of the edges of the connector holes 35, thereby allowing wires and cables to pass through without the risk of stripping and shorting. This method of connecting allows for the development and manufacture of "pluggable" components that can be quickly installed using standard cable connectors. Along the outer edges of cable chase 32 are a number of threaded studs 34 for component mounting. The threaded studs 34 are evenly spaced to allow for consistent development of component mounting brackets. Components such as power supplies and controller boards can be mounted to brackets that then attach (e.g., bolt) to the threaded studs 34.

Connection bracket 33 contains a number of connection slots 36 used to connect outer components to substructure 29. These components are typically (but not limited to) exterior plastic structures used as the decorative shell of the top box display. While only four connection slots 36 are shown in FIG. 3, the number of connection slots 36 may be more or less depending on the requirements of the top box displays using the substructure 29. Typically, nuts and bolts are used to connect exterior shells to the connection bracket 33 via connection slots 36. Soft washers, such as rubber or fiber, may also be used to ensure proper fit and prevent over-torque when attaching plastic components to the substructure.

The final component in the composition of the substructure 29 is a marquee top plate 38. Marquee top plate 38 attaches to the top of the assembly comprised of cable chase 32 and connection bracket 33. Supporting brackets may be used if the weight of the marquee attached to the marquee top plate 38 requires additional support.

Figure 4:
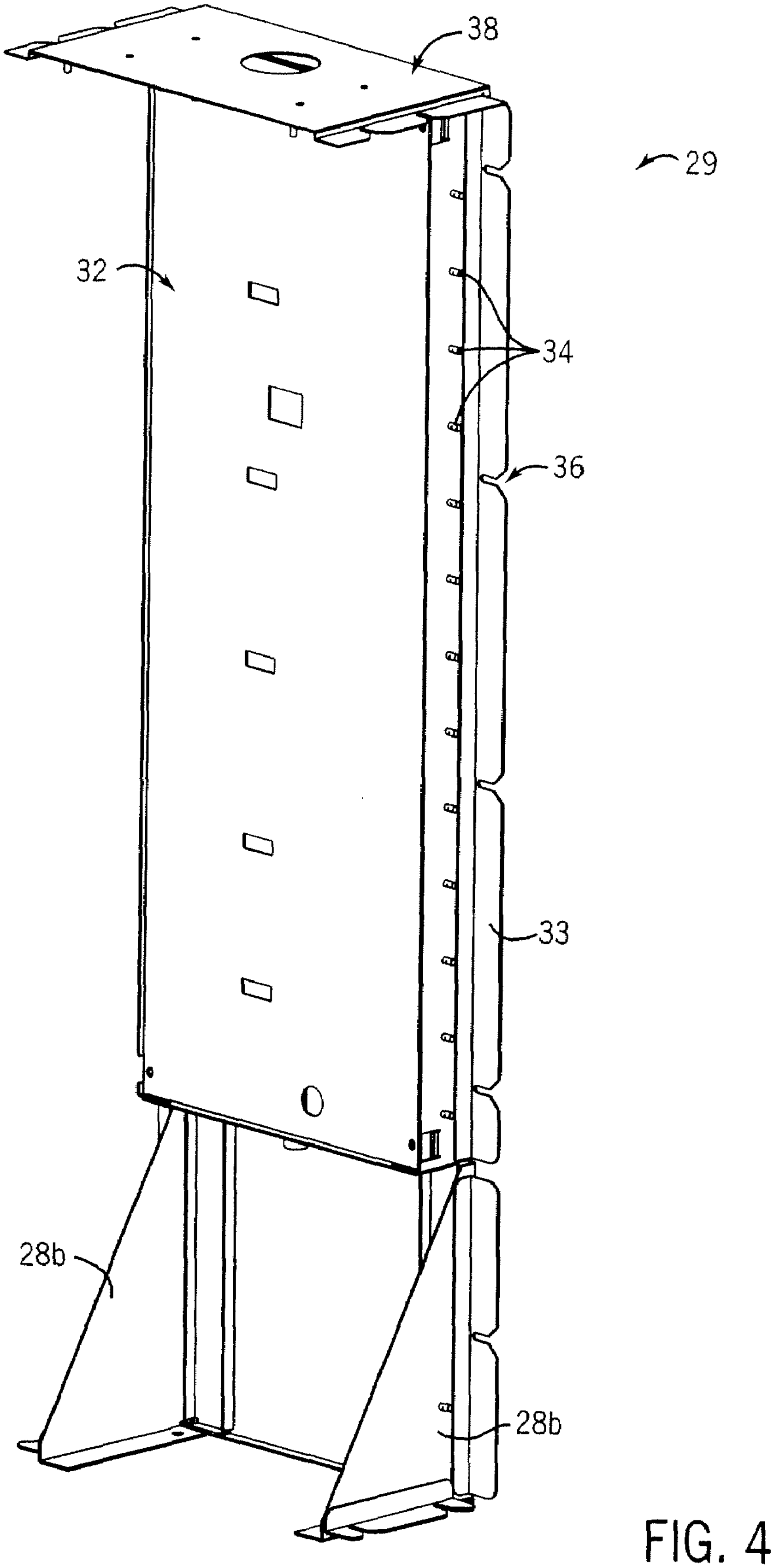
FIG. 4 is a perspective view of a top box substructure for a slant top gaming machine.

FIG. 4 shows an alternative substructure for a slant top gaming machine. Transition bracket **28*b* connects to the base game. The angle of transition bracket 28*b*** matches the angle of the slant top gaming machine. While varying in size, the rest of the components comprising this substructure are substantially identical to the upright gaming machine top box substructure.

Figure 5:
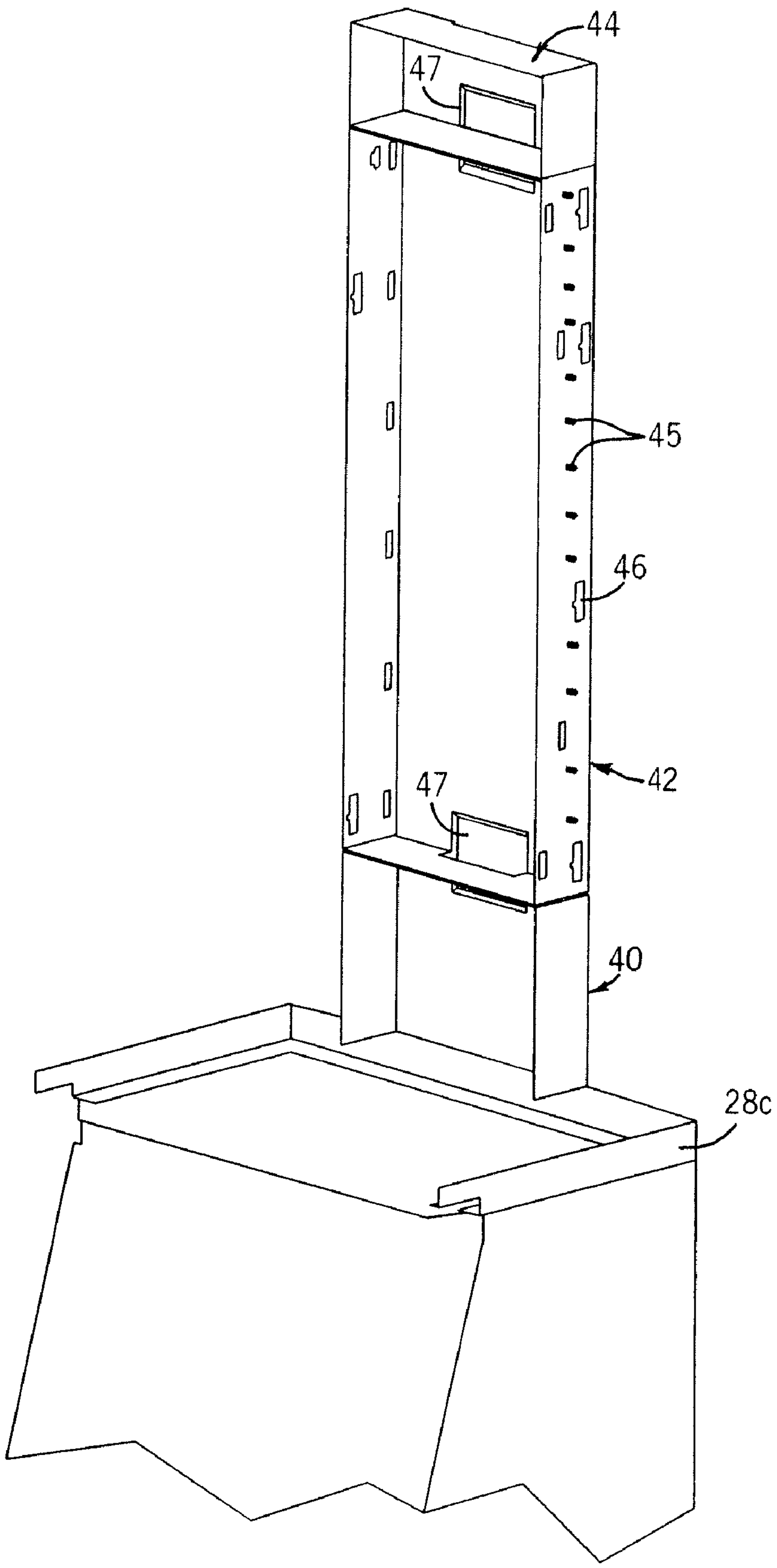
FIG. 5 is a perspective view of an alternate top box substructure for an upright gaming machine.

FIG. 5 shows an alternative upright gaming machine top box substructure. A transition bracket **28*c* that connects this substructure to the base game is similar to transition brackets presented in the previous figures. The upright structure in this example is comprised of three modules: a base module 40, a center module 42, and a top module 44. Threaded studs 45 and connection slots 46 are also part of the center module 42. The top module 44 acts as the base for the game's marquee. Cable transition slots 47** are incorporated between each module.

Figure 6:
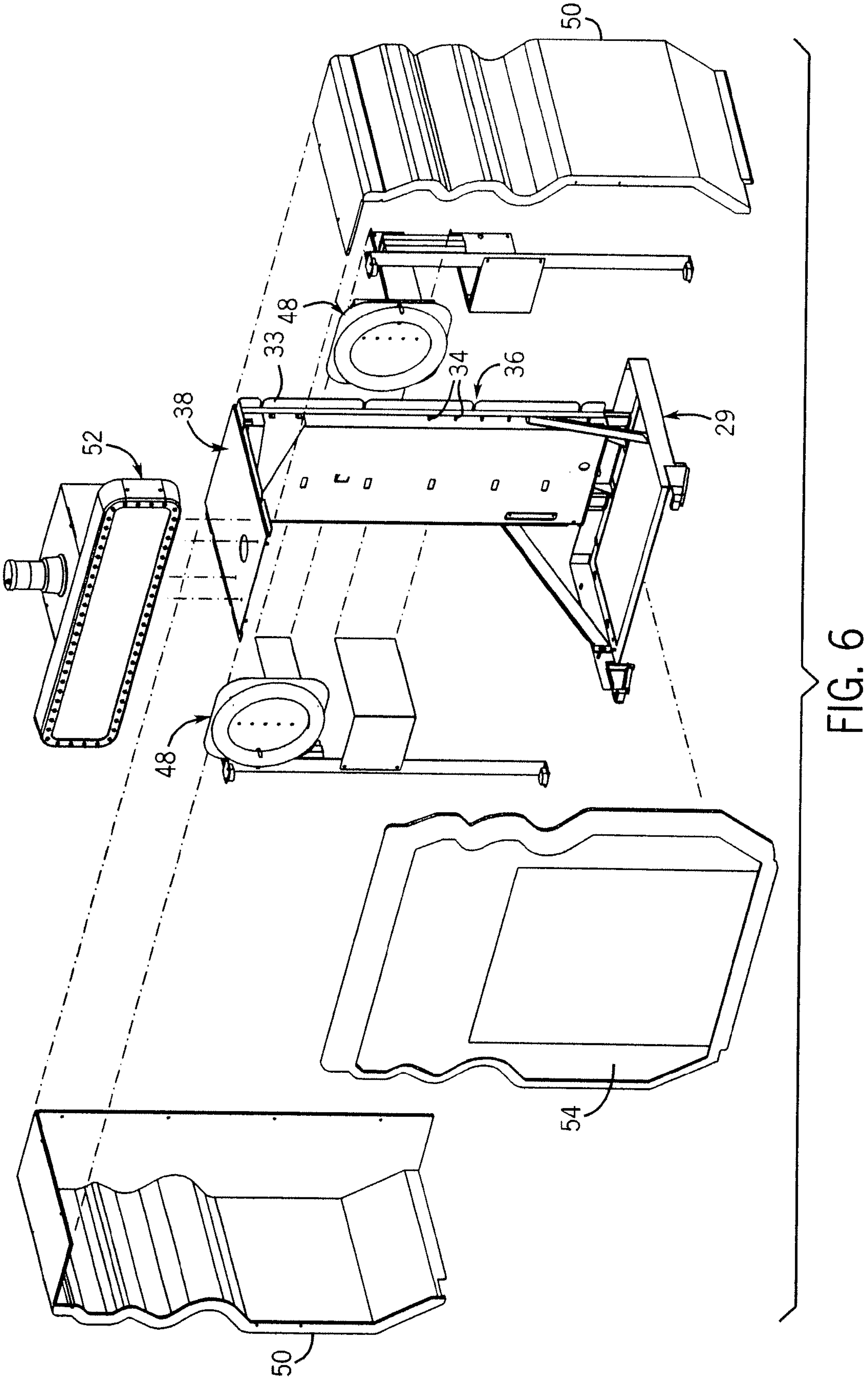
FIG. 6 is an assembly drawing of one embodiment of a top box display.
Figure 7:
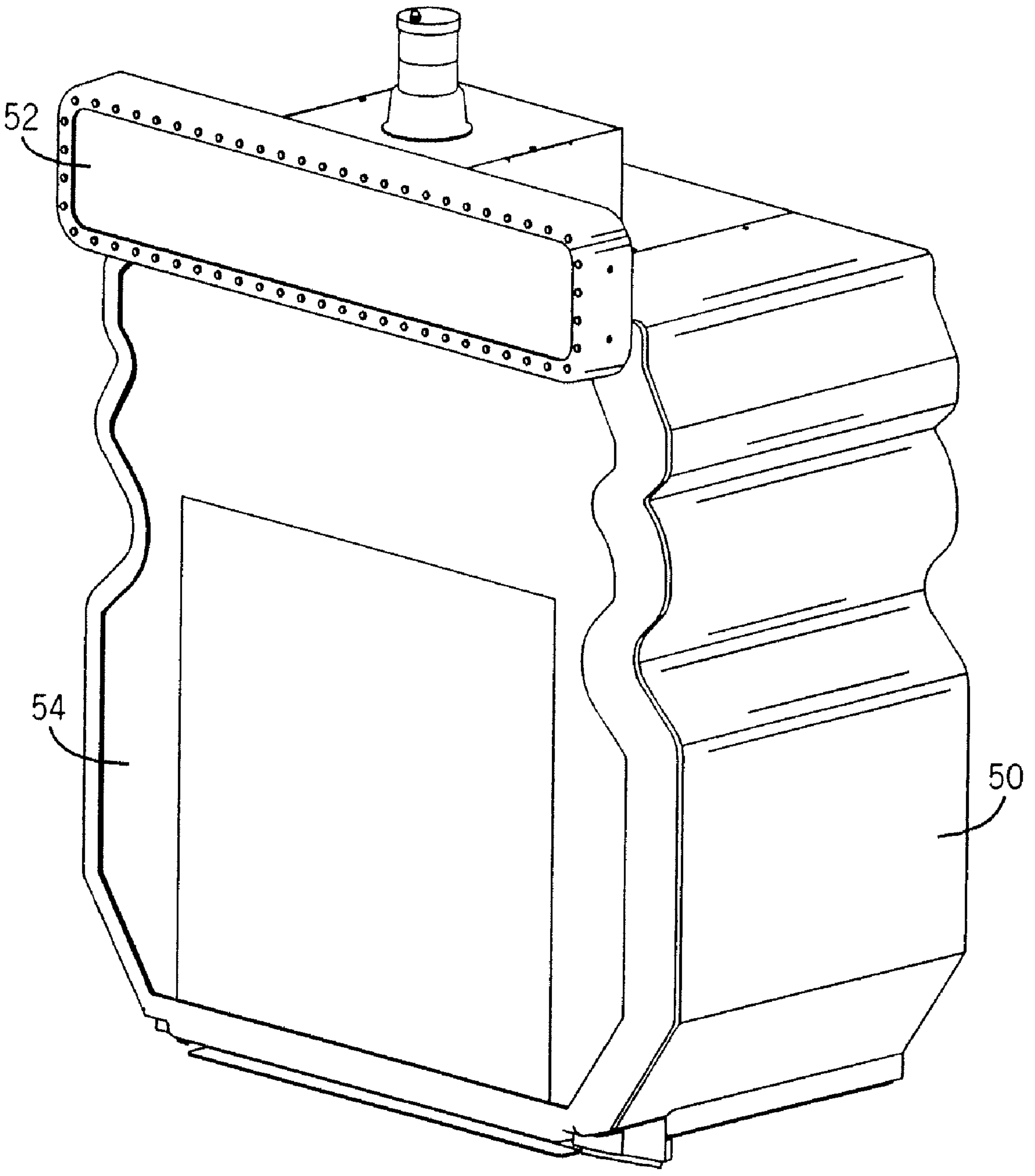
FIG. 7 is a perspective view of a completed top box directly related to the assembly shown in FIG. 6.

FIG. 6 is an assembly drawing of a top box display for an upright gaming machine. A subassembly 48, comprised of a bracket assembly and fluorescent lighting, is attached to the threaded studs 34 (on the side of cable chase 32) on the top box substructure 29. Molded side panels 50 are attached to connection slots 36 on connection bracket 33 followed by a front panel 54 which, in this example, is attached to the molded side panels 50. Finally, a marquee 52 is attached to the top plate 38. FIG. 7 shows the final result of the assembly. Other subassemblies such as power supplies and controller boards are typical to this type of top box but are not shown in these figures.

While providing a common platform for other components, the top box substructure also offers an alternative to the current methods by which repairs or conversions are performed. If each gaming machine contains a common substructure, the method of conversion and/or repair can be standardized. For example, components that attach to the substructure can also be standardized between gaming machines. Devices such as power supplies and their associated mounting brackets can be manufactured to fit any gaming machine containing the top box substructure. Lighting components, video displays, and other mechanical devices can all be produced in a modular fashion allowing the service technician the ability to carry a small inventory of each and be able to "swap out" a component if a repair is needed. These components can all be pre-approved to maintain strict adherence to product safety and gaming industry regulations and requirements.

When a game conversion is required, instead of replacing the entire top box, the service technician receives new subassemblies, side covers, and front glass of the top box (for the new game theme) and uses other components from his/her inventory (if necessary) to change the top box to the new game. This approach allows the conversion to be performed by a single technician, since the component parts individually weigh much less than the entire top box structure. Thus, a single service technician can respond to the conversion request rather than multiple technicians.

Figure 8:
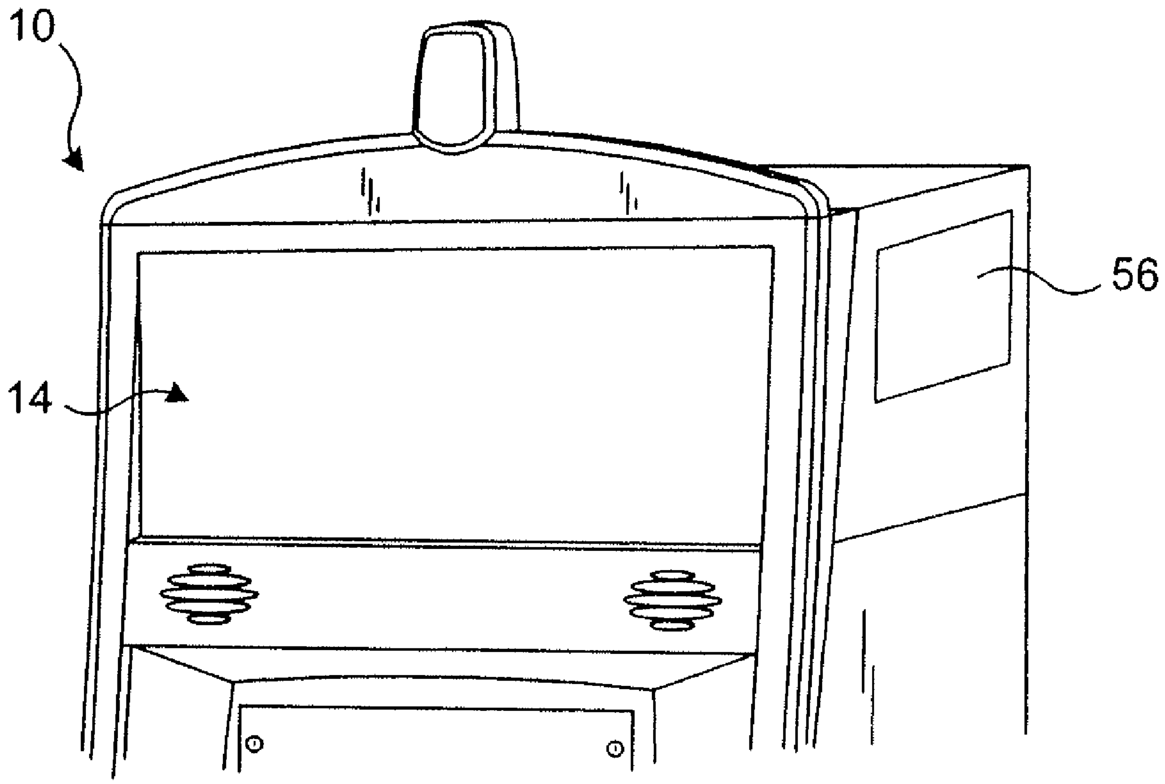
FIG. 8 is a perspective view of an alternative top box feature.

All examples of top box substructures can be fitted with a variety of "outer shells" and front display glass. Outer shells can be made of a variety of materials, be of any shape, and contain any features relevant to the play of the game or to attract players to the game. For example, the side shells of the top box display that attach to the substructure may contain a side facing artwork panel that is backlit from within the top box. This artwork panel may contain the name of the game or other artwork such as advertisements. The position of the top box side display artwork allows casino patrons moving past a row of gaming machines to view information placed on the game without having to stand directly in front of the machine. FIG. 8 shows an example of how an artwork panel 56 is placed on the side of the top box 14 on the gaming machine 10. A light source within the top box illuminates the artwork panel 56. The composition of artwork panel 56 can be glass or another translucent substance such as clear plastic. Other side displays such as non-translucent panels illuminated by an external light source can also be used as an alternative.

While the present invention has been described with reference to one or more particular embodiments, those skilled in the art will recognize that many changes may be made thereto without departing from the spirit and scope of the present invention.

For example, while the previous examples present what could be viewed as a fixed height substructure, a modular approach such as the one described in FIG. 5 could be used to allow for varying heights of top box displays based on the requirements of the design.

Each of these embodiments and obvious variations thereof is contemplated as falling within the spirit and scope of the claimed invention, which is set forth in the following claims.

What is claimed is:

1. A method of converting a gaming machine from a first game to a second game, the method comprising:

removing a plurality of first outer display elements of a top box associated with the first game, the first outer display elements supported on a standardized substructure of the top box; and installing a plurality of second outer display elements on the substructure of the top box in place of the plurality of first outer display elements, the second outer display elements being associated with the second game, at least a portion of the second outer display elements having a different shape than the first outer display elements, wherein the substructure is substantially concealed from a player's view during normal operation of the gaming machine by the outer display elements, the first outer display elements and the second outer display elements comprising decorative shell elements of the top box, the first outer display elements and the second outer display elements substantially enclosing the front and sides of the top box.

2. The method of claim 1, wherein the first display elements are mounted to the substructure, wherein the removing step disconnects the first display elements from the substructure, and wherein the installing step mounts the second display elements to the substructure.

3. The method of claim 1, wherein the first display elements and the second display elements are further selected from a group consisting of sculptures, video displays, and mechanical displays.

4. The method of claim 1, wherein the first display elements include a first side facing artwork panel adapted to be backlit from within the top box, and wherein the second display elements include a second side facing artwork panel adapted to be backlit from within the top box.

5. The method of claim 1, wherein at least a portion of the standardized substructure is situated toward the back of the top box.

6. A group of components for converting a top box display on a gaming machine from a first game to a second game, the group of components comprising:

one or more second exterior display elements associated with the second game, the one or more second exterior display elements adapted to mount to a standardized substructure of the top box display in place of one or more first exterior display elements associated with the first game after the one or more first exterior display elements are removed from the substructure, wherein at least a portion of the second exterior display elements have a different shape than the first exterior display elements, the first exterior display elements and the second exterior display elements comprising decorative shell elements, at least a portion of the first exterior display elements and the second exterior display elements include a side panel for the top box display.

7. The group of components of claim 6, wherein the substructure includes a cable chase defining a space for accommodating power and data cables.

8. The group of components of claim 7, wherein the cable chase is adapted to support power supplies and controller boards.

9. The group of components of claim 7, wherein the cable chase includes a plurality of connector holes for mounting standardized cable connectors.

10. The group of components of claim 6, wherein a portion of the one or more first display elements and the one or more second display elements are further selected from a group consisting of sculptures, video displays, and mechanical displays.

11. The group of components of claim 6, wherein the side panel includes a side facing artwork panel adapted to be backlit from within the top box display.

12. A gaming machine convertible from play of a first game to play of a second game, the machine comprising:

a top box display having a standardized internal substructure, the substructure being substantially concealed from a player's view during normal operation of the gaming machine by outer display elements, the substructure configured to support one or more first outer display elements associated with the first game when the machine is operable to play the first game, the substructure further configured to support one or more second outer display elements associated with the second game when the machine is operable to play the second game, the one or more second outer display elements adapted to mount to the substructure in place of the one or more first outer display elements after the one or more first display elements are removed from the substructure, wherein at least a portion of the second outer display elements have a different shape than the first outer display elements, the first outer display elements and the second outer display elements comprising decorative shell elements for the top box, at least a portion of the first outer display elements and the second outer display elements including a side panel for the top box display.

13. The machine of claim 12, wherein the substructure includes a cable chase defining a space for accommodating power and data cables.

14. The machine of claim 13, wherein the cable chase is adapted to support power supplies and controller boards.

15. The machine of claim 13, wherein the cable chase includes a plurality of connector holes for mounting standardized cable connectors.

16. The machine of claim 13, wherein the cable chase is vertically oriented within the substructure.

17. The machine of claim 12, wherein the one or more first outer display elements and the one or more second outer display elements are selected from a group consisting of sculptures, video displays, and mechanical displays.

18. The machine of claim 12, wherein the side panel includes a side facing artwork panel adapted to be backlit from within the top box display.

19. A gaming machine convertible from play of a first game to play of a second game, the machine comprising:

a top box display having a standardized internal substructure, the substructure being substantially concealed from a player's view during normal operation of the gaming machine by one or more exterior display elements, the substructure configured to support the different sets of one or more exterior display elements depending upon which of the first and second games that the machine is operable to play, wherein at least a portion of the exterior display elements between the first and second games have different shapes, the exterior display elements comprising decorative shell elements for the top box, at least a portion of the exterior display elements including side panels for the top box.

20. The machine of claim 19, wherein at least a portion of the standardized substructure is situated toward the back of the top box.

* * * * *